(12) United States Patent
Rajalin et al.

(10) Patent No.: US 8,544,377 B2
(45) Date of Patent: Oct. 1, 2013

(54) MOUNT FOR A MOTORCYCLE, A HEAVY WEAPON, OR A MOTORCYCLE EQUIPPED WITH A HEAVY WEAPON

(75) Inventors: Tom Rajalin, Rajamäki (FI); Mikko Helkama, Helsinki (FI); Tero Huopaniemi, Tokyo (JP)

(73) Assignee: Wolf Pack Oy (FI)

( * ) Notice: Subject to any disclaimer, the term of this patent is extended or adjusted under 35 U.S.C. 154(b) by 31 days.

(21) Appl. No.: 13/389,691

(22) PCT Filed: Aug. 3, 2010

(86) PCT No.: PCT/FI2010/050617
§ 371 (c)(1),
(2), (4) Date: Mar. 26, 2012

(87) PCT Pub. No.: WO2011/018548
PCT Pub. Date: Feb. 17, 2011

(65) Prior Publication Data
US 2012/0174769 A1    Jul. 12, 2012

(30) Foreign Application Priority Data
Aug. 12, 2009  (FI) .................................... 20095834

(51) Int. Cl.
*F41A 23/38*    (2006.01)
*B62H 1/06*    (2006.01)

(52) U.S. Cl.
USPC .......................................... 89/40.04; 280/303

(58) Field of Classification Search
USPC ............ 89/40.01, 40.04, 40.06, 40.13, 40.15; 42/94; 280/298, 300, 301, 303
See application file for complete search history.

(56) References Cited

U.S. PATENT DOCUMENTS

| | | | |
|---|---|---|---|
| 1,273,178 A * | 7/1918 | Perry et al. .................. | 89/40.04 |
| 1,273,179 A * | 7/1918 | Perry et al. .................. | 89/40.04 |

(Continued)

FOREIGN PATENT DOCUMENTS

| | | |
|---|---|---|
| DE | 412303 | 4/1925 |
| FI | 116094 | 9/2005 |
| FR | 542400 | 8/1922 |
| GB | 1914 20874 | 1/1916 |

OTHER PUBLICATIONS

International Search Report dated Oct. 29, 2010 issued in corresponding international application No. PCT/FI2010/050617.

(Continued)

*Primary Examiner* — Bret Hayes
(74) *Attorney, Agent, or Firm* — Ostrolenk Faber LLP

(57) ABSTRACT

The present invention relates to a stand (100) for a motorcycle, a heavy weapon (70) or a motorcycle (1) equipped with the heavy weapon (70). The stand (100) includes a propping unit (101, 102 and 105) as well as pivoting means (103, 104) for enabling the propping unit (101, 102 and 105) to be swiveled between a working position and a storage position. The propping unit (101, 102 and 105) includes two propping elements (101 and 102). The pivoting means (103, 104) include a pivoting element (103), which allows a simultaneous swiveling and outward spreading motion of the propping elements (101 and 102) from the storage position in the proximity of the chassis of a motorcycle, the heavy weapon (70) or a motorcycle equipped with the heavy weapon (70) to the working position, and locking means (108, 109 and 110) for securing the propping elements (101 and 102) in the working position and in the storage position.

6 Claims, 6 Drawing Sheets

(56) References Cited

U.S. PATENT DOCUMENTS

| | | | | |
|---|---|---|---|---|
| 1,876,995 | A | * | 9/1932 | Manzer .................. 89/40.04 |
| 2,085,024 | A | * | 6/1937 | Johnston ................ 89/40.04 |
| 2,171,042 | A | * | 8/1939 | Minton .................... 180/219 |
| 2,407,884 | A | * | 9/1946 | Johnston ................ 89/40.04 |
| 4,351,224 | A | * | 9/1982 | Curtis .................... 89/37.04 |
| 4,377,295 | A | * | 3/1983 | Lemman ................ 280/303 |
| 4,693,488 | A | * | 9/1987 | Bernocco ............... 280/293 |
| 5,604,327 | A | * | 2/1997 | Skoglund et al. ........... 89/46 |
| 6,763,627 | B1 | | 7/2004 | Kaempe |
| 6,945,549 | B1 | * | 9/2005 | Hare ...................... 280/293 |
| 7,850,187 | B1 | * | 12/2010 | Ford ...................... 280/293 |
| 2006/0278797 | A1 | | 12/2006 | Keng et al. |
| 2007/0278764 | A1 | | 12/2007 | Rajalin et al. |
| 2008/0191448 | A1 | * | 8/2008 | Suzuki et al. ............ 280/301 |

OTHER PUBLICATIONS

Written Opinion of the International Searching Authority dated Oct. 29, 2010 issued in corresponding international application No. PCT/FI2010/050617.

* cited by examiner

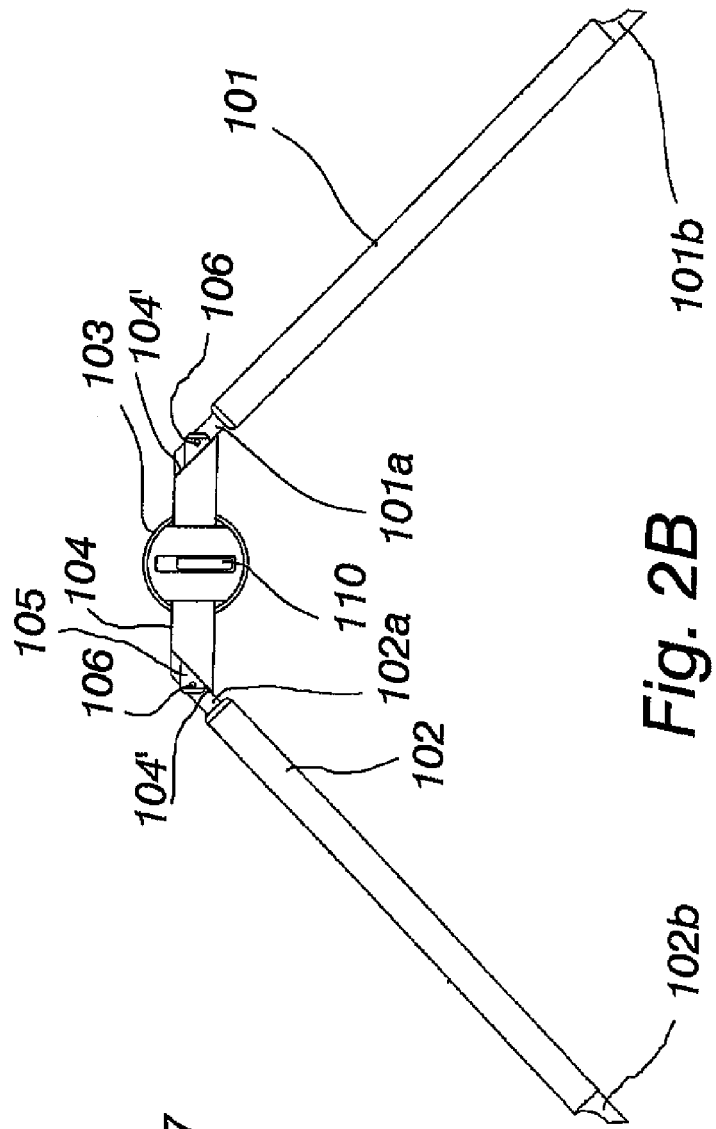
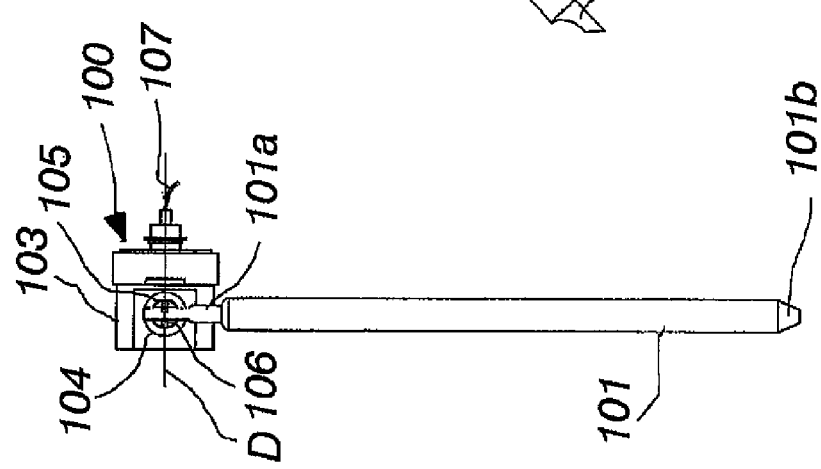
Fig. 2A
Fig. 2B

MOUNT FOR A MOTORCYCLE, A HEAVY WEAPON, OR A MOTORCYCLE EQUIPPED WITH A HEAVY WEAPON

CROSS REFERENCE TO RELATED APPLICATIONS

The present application is a 35 U.S.C. §371 National Phase conversion of PCT/FI2010/050617, filed Aug. 3, 2010, which claims benefit of Finnish Application No. 20095834, filed Aug. 12, 2009, the disclosure of which is incorporated herein by reference. The PCT International Application was published in the English language.

BACKGROUND OF THE INVENTION

The present invention relates to a mount or a stand for a motorcycle, a heavy weapon, or a heavy weapon-equipped motorcycle, said stand comprising a propping unit as well as pivoting means for swiveling the propping unit between a working position and a storage position.

The foregoing prior known stands have been used for example on a motorcycle disclosed in Patent publication FI 116094. A typical stand is a bracket type leg on one side of the motorcycle, which can be flipped about a fulcrum towards the ground or some other foundation. Prior known is also a stand, which is slightly different in design from those described above and which is located on the underside of a motorcycle and can be turned to a working position by moving the entire motorcycle, as a result of which the stand rotates about its rotation axis to the working position.

A problem with both of the prior known stands is that the motorcycle is left in an inclined position, leaning quite unsteadily against the stand. In particular, the stands are not secure on a sloping, uneven and/or soft foundation, wherein the center of gravity of a motorcycle and/or a heavy weapon is in such a location that the motorcycle topples over easily as a result of inadequate support in lateral and longitudinal directions.

It is an object of the present invention to eliminate the foregoing problems.

SUMMARY OF THE INVENTION

According to the invention, the above-mentioned object is fulfilled in such a way that the propping unit includes two propping elements, and that the pivoting means include an element which allows a simultaneous swiveling and outward spreading motion of the propping elements from the storage position in the proximity of the chassis of a motorcycle, a heavy weapon, or a heavy weapon-equipped motorcycle to the working position, as well as locking means for securing the propping elements in the working position and in the storage position, that the propping unit includes two propping elements, and that the pivoting means include: a pivoting element, which controls the propping elements to simultaneously swivel and spread outward from a storage position in the proximity of the chassis of a motorcycle, the heavy weapon or a motorcycle equipped with the heavy weapon to a working position, as well as locking means for securing the propping elements in the working position and in the storage position, that the pivoting element is adapted to allow a swiveling motion of the propping elements about a rotation axis extending in the advancing direction of a motorcycle, the heavy weapon or the motorcycle equipped with a heavy weapon, or about a rotation axis extending substantially in a longitudinal direction of the heavy weapon, and that the pivoting means include formations for locking the propping elements in a desired swiveling position.

The present invention provides a stand, which enables a motorcycle and/or a heavy weapon to be steadily set in a substantially upright position regardless of the contours, inclination or composition of a foundation. Accordingly, for example a heavy weapon-equipped motorcycle known from publication FI 116094 can be set up at its firing emplacement in a steady upright position regardless of terrain features. Hence, the discussed weapon can be left for example by itself at its firing position, and it can be preferably operated with wireless or wired remote control. It is also possible that a heavy weapon alone or a motorcycle alone be equipped with a stand according to the invention.

Preferred embodiments of the present invention are presented in the dependent claims.

BRIEF DESCRIPTION OF THE DRAWINGS

The invention will now be described more precisely with reference to the accompanying drawings, in which:

FIG. 2A shows a stand of the invention in a working position in a view from the side of a motorcycle, FIG. 2B shows the stand of FIG. 2A in a view from the front of a motorcycle.

DESCRIPTION OF PREFERRED EMBODIMENTS

Figure 1A:
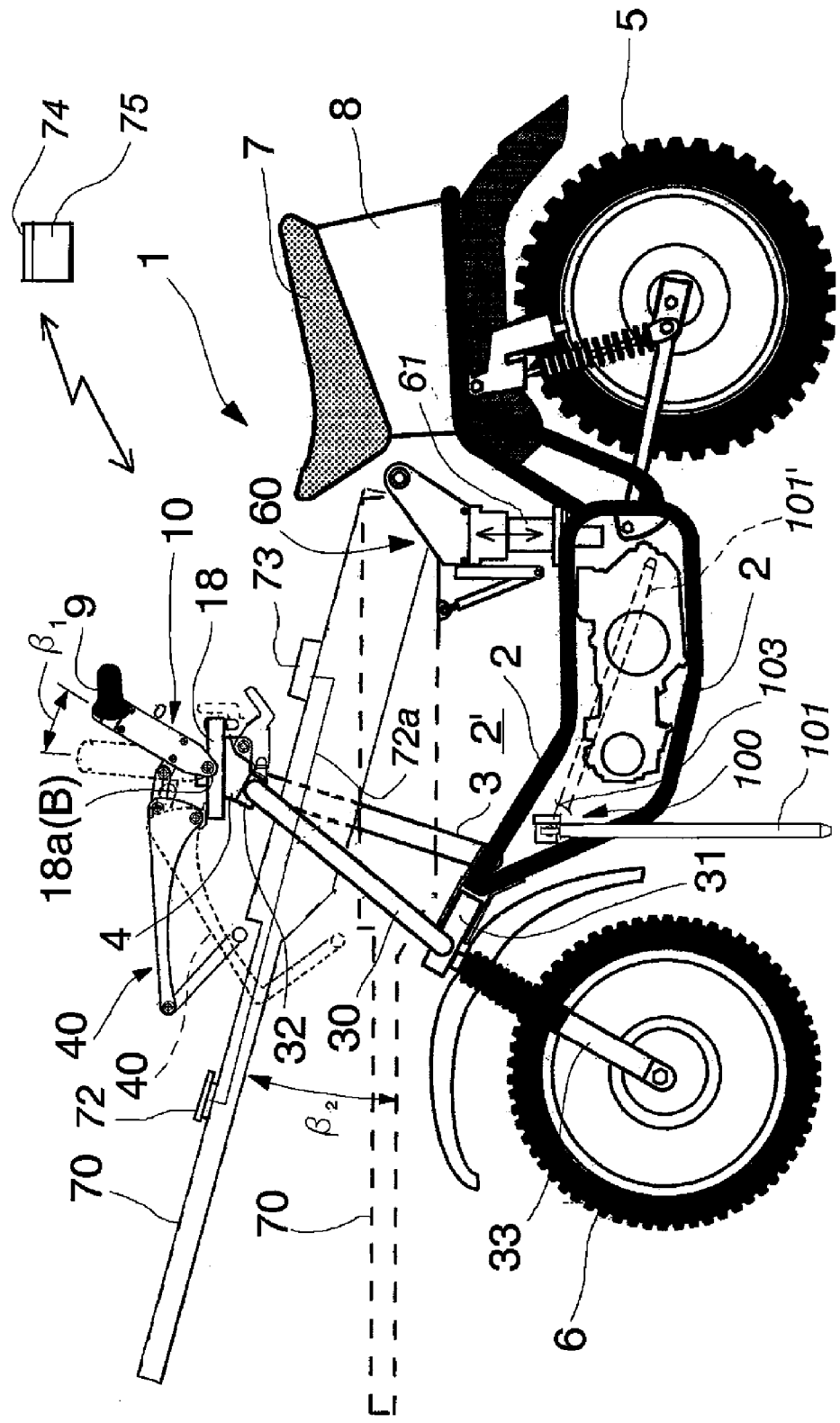
FIG. 1A shows a side view of a motorcycle equipped with a stand of the invention.
Figure 1B:
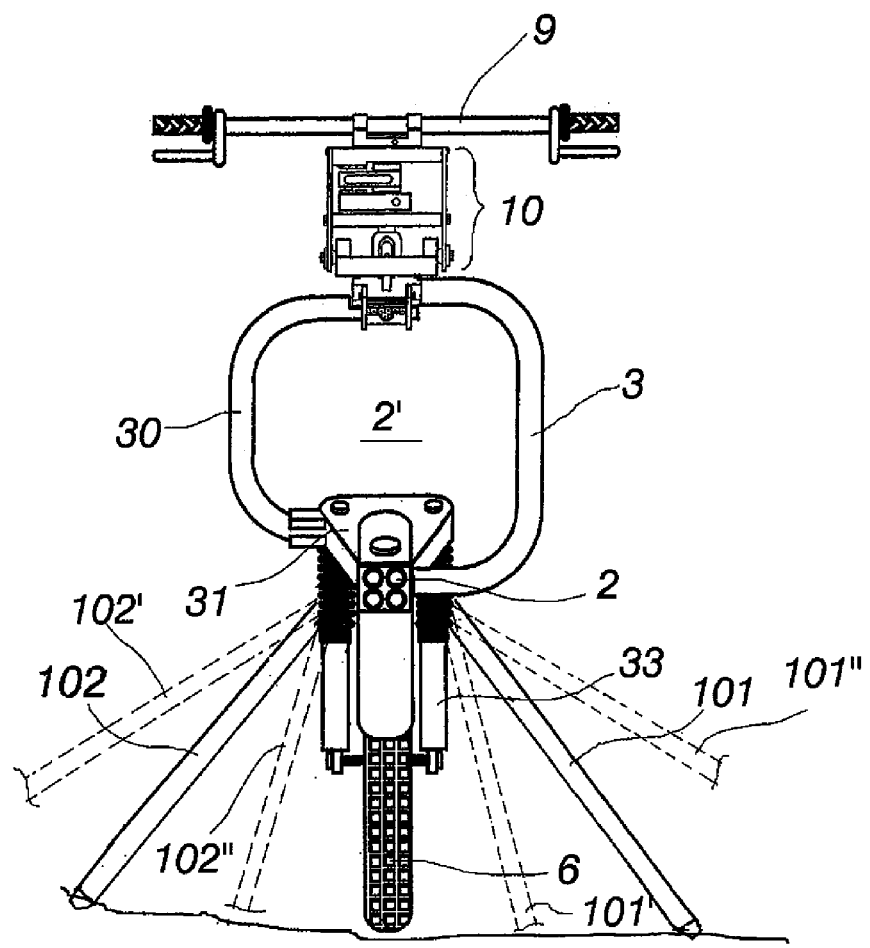
FIG. 1B shows the motorcycle of FIG. 1 in a frontal view.

Thus, FIGS. 1A and 1B illustrate a motorcycle 1, which is particularly suitable for use with a stand 100 of the present invention. The motorcycle 1 includes a preferably frame type chassis member 2, which is low-mounted and has its rear section fitted with a rear tire 5 and a seat member 7. Between the rear tire 5 and the seat member 7 is preferably fitted a fuel tank 8 or another power-supply storage element, such as a battery. The result of this is a void space 2' in front of the seat 7. The motorcycle 1 has its engine fitted within the chassis member 2.

The chassis member 2 has its forward part fitted with a front frame 3 and 4, which is associated with pivoting means 10, 30, 33 adapted to be movable relative to the front frame 3, 4. The pivoting means 10, 30, 33 are in turn fitted essentially between a handlebar 9 and a front tire 6, whereby turning motions of the handlebar 9 around a rotation axis are transmitted during a ride (transportation of the weapon) to the front wheel 6 for steering the motorcycle 1. The front frame 3, 4 includes a connecting link 3, having its top end and bottom end bent laterally relative to the longitudinal axis of the chassis member 2, whereby a section remaining therebetween and extending substantially upwards from the chassis member 2 is located at a distance from the longitudinal axis of the chassis member 2. This distance is preferably about 20-50 centimeters. At the end of the upper lateral link, in the same vertical plane with respect to the longitudinal axis of the chassis member 2, is mounted a bearing seat 4. The pivoting means 10, 30, 33 in turn include a front fork 33 associated with the front tire 6. The front fork 33 is provided with a substantially upward-pointing extension in the form of a second connecting link 30, which is connected at its bottom portion 30a to the chassis 2 by way of a bearing 31. By its top portion 30b, the connecting link 30 is in contact with an articulated shaft, which is extended through the bearing seat 4 and constitutes part of a connecting mechanism 10 included in the pivoting means. One preferred embodiment of the connecting mechanism 10 is described in Patent publication FI 116094 and, thus, not discussed further at this time.

The second connecting link 30 has its bottom and top ends bent in a lateral direction the same way as the connecting link 3 included in the front frame 3, 4, but in the opposite direction. Thus, the area between the chassis member 2 and the bearing seat 4, as well as between the connecting links 3 and 30, constitutes an opening, i.e. a vacant space. This enables a relatively large weapon 70 to be introduced through the opening, with some horizontal and vertical clearance still left for directing the weapon. The weapon can have its rear portion set on its mounting 60 fitted in a space 2' provided in front of the seat 7. The weapon can have its rear portion preferably raised or lowered in a substantially vertical direction by means of a lifting cylinder n61 or the like hoisting device included in the mounting. This enables making the above-mentioned opening (vacant space) as small as possible, and vertical aiming of the weapon. The weapon 70 has its forepart positioned in front of the motorcycle 1 on suspension elements, which can be articulated arms or hydraulic or pneumatic cylinders. It can be seen from FIG. 1A that a stand 100 according to one embodiment of the invention is positioned in a forepart of the chassis member 2. It should be noted at this point that the stand of the invention is suitable for use as a stand for an ordinary motorcycle (including small motorcycles, such as mopeds, scooters), as well as directly for a heavy weapon.

The stand 100 will now be described more closely in terms of its structure and operation with reference to FIGS. 2A-4. In FIGS. 2A and 2B, the stand 100 according to the invention is visible in a working position. The stand includes pivoting means 103, 104 as well as a propping unit, including propping elements 101 and 102 which are located relative to each other substantially on opposite sides of the pivoting means 103. The propping elements 101 and 102 are coupled with each other by way of an elongated distance piece 105 included in the propping unit and set in engagement with the pivoting means 103, 104. The distance piece 105 has its ends provided with joints 106, to which are pivotably articulated respective first ends 101a and 102a of the propping elements 101 and 102.

The pivoting means 103, 104 include a pivoting element 103, consisting of a first body segment 103a, as well as of a second body segment 103b. The first body segment 103a comprises a sleeve-like bearing element, which constitutes a rotation axis substantially co-directional with the chassis of a motorcycle and which is made stationary with respect to the chassis of a motorcycle or, respectively, the body of a weapon. The second body segment 103b has been extended by way of its cylindrical bearing surface 103b' to contact with a sleeve-like internal surface of the first body segment 103a (cf. FIG. 4). Accordingly, the second body segment 103b and the propping elements 101 and 102 set in engagement therewith, as well as the distance piece 105, are able to rotate around an axis D provided that the locking means thereof are in a release position (described subsequently in more detail). Preferably, the axis D is substantially co-directional with the traveling direction of a motorcycle (or, respectively, with the longitudinal direction of a weapon). Pivoting of the propping elements to extreme positions around the axis D is visualized with propping elements 101' and 102' and 101" and 102", respectively, depicted in dashed lines in FIG. 1B. In the example shown in the figure, the maximum deflection angle from a center position is about 15° in either direction, i.e. 30° in total, but naturally the maximum deflection angle can be other than this. The propping elements 101 and 102 are preferably length adjustable, for example by means of telescopically nested extension shafts (not shown). What is essential is that, in the working position, the distance of the propping elements' second ends 101b and 102b from the longitudinal center axis, as well as from each other in a transverse direction, is sufficient for achieving a widespread support of the invention.

The pivoting element 103 has its wall defining a space 103', which is adapted to house locking means for securing the propping elements in a working position and in a storage position in a subsequently described manner. On the pivoting element 103 or in engagement therewith is provided an element 104 adapted to be stationary with respect to the second body segment 103b of the pivoting element 103. The element 104 is a tubular element with its ends extending beyond the pivoting element 103 on opposite sides. With the propping elements 101 and 102 in a storage position, the tube in terms of its length is preferably in a perpendicularly crosswise position with respect to the motorcycle chassis. In addition, the tube opens up into the above-mentioned wall-defined space 103'. The tube has its inner diameter dimensioned to receive an elongated distance piece 105 so as to enable the distance piece 105 to rotate within the tube, most conveniently with a sliding fit, around its longitudinal axis (a rotation axis C). The distance piece 105 is preferably a shaft in the shape of an elongated cylinder. The tube element 104 has its ends formed with bevel surfaces 104', against which the propping elements' first ends 101a and 102a are bearing, as shown in FIG. 2B, while rotating simultaneously along with the distance piece 105, as well as around the joints 106 between the distance piece 105 and the propping elements' first ends 101a and 102a. Consequently, the inclination of the bevel surfaces 104' with respect to the longitudinal axis (the rotation axis C) of the tube determines a spreading angle between the propping members. The bevel surfaces are preferably planar, yet may assume some other shape for a non-linear pivoting motion.

Figure 3:
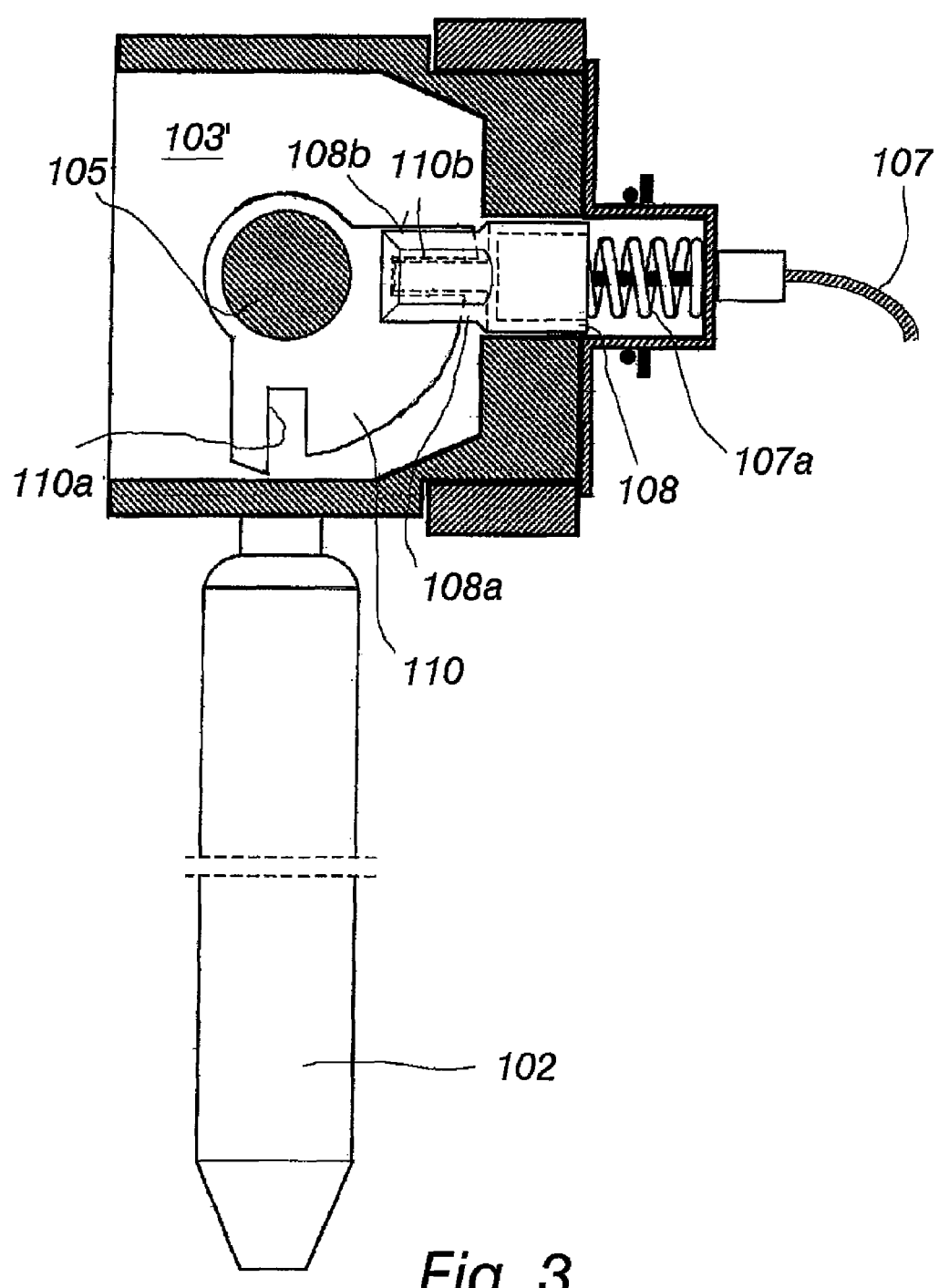
FIG. 3 shows the stand in a working position in a partially cut-away side view.
Figure 4:
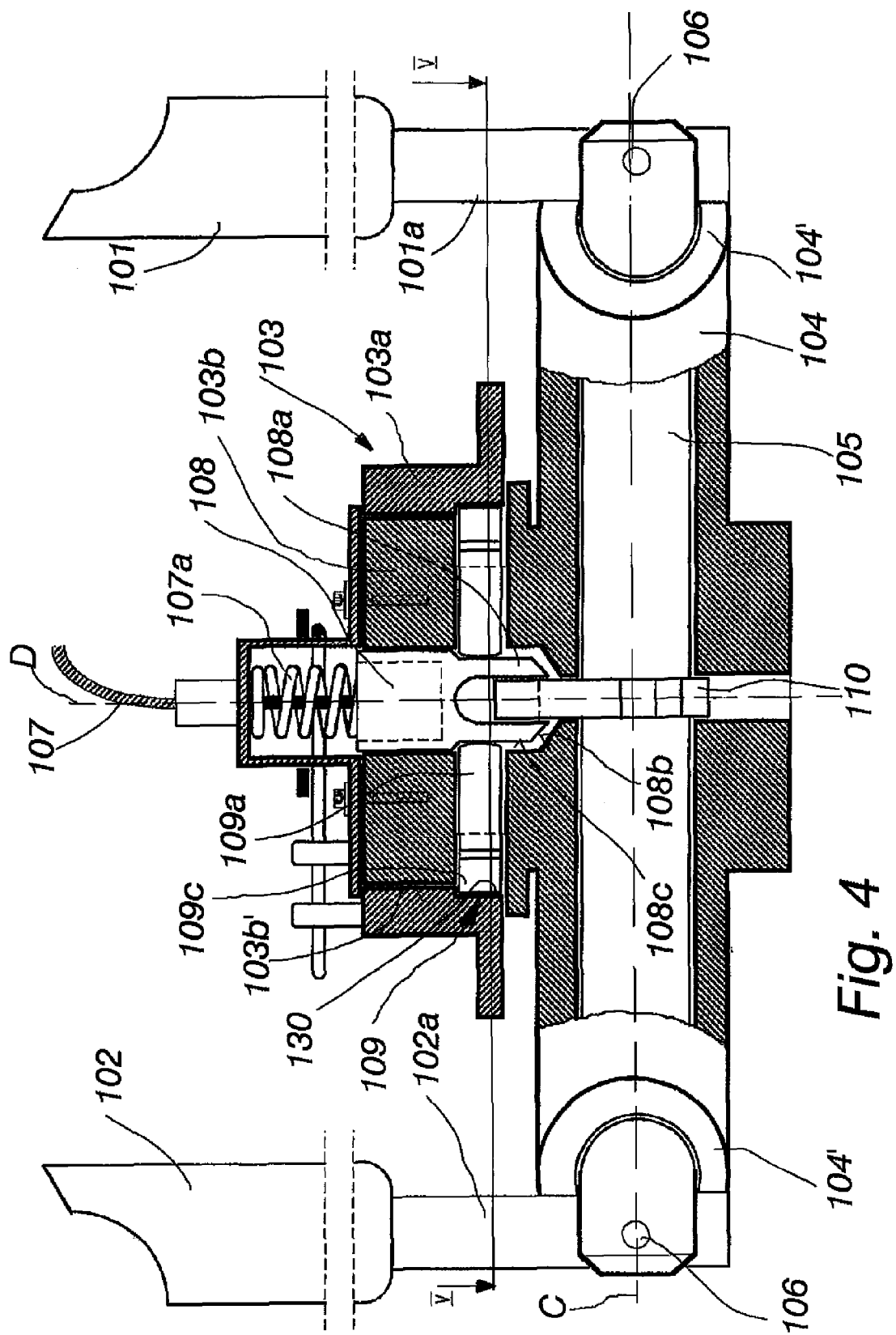
FIG. 4 shows the stand in a storage position in a partially cut-away view from above a motorcycle.

Thus, FIGS. 3 and 4 illustrate in cross-section the stand 100 and the body 103 in a side view, the second body segment 103b of which is adapted to house locking means 108, 109 and 110. In the illustrated embodiment, the locking means include a locking flange 110, which is adapted to rotate along with the distance piece 105. As for its basic form, the locking flange 110 is preferably a flat type element in the shape of a circle sector, which is adapted to rotate about an axis extending through the center of an imaginary circle defined by the outer arc of the circle sector. This axis is also the rotation axis C for the distance piece (rotating shaft) 105. In the locking flange, on the surface of the circular arc segment of the sector, are formed two recesses 110a and 110b or the like extending towards the center point of the sector. Alongside those, the locking flange 110 is also formed with retainers, consisting of lugs, which are made in the locking flange 110 alongside the recesses and which extend in a radial direction of the sector arc beyond the arc. The function of those is to limit the turning motion of the propping elements 101 and 102 around the joints 106 in such a way that the propping elements are only able to swivel between the storage position and the working position. The locking means include preferably an elongated locking bar 108, having its end provided with a shaped lug 108a which is optionally insertable in the recess 110a or 110b, depending on the position of the propping elements 101 and 102 (working position or storage position), for securing the propping elements 101 and 102. The locking bar 108, and thereby the lug 108a, is subjected to the action of a power unit 107a, such as a coil spring, which pushes the lug 108a into the recess by its springback factor. In FIG. 3, the lug 108a has become inserted into the recess 110b, in which case the locking flange 110 and thereby the propping elements 101 and 102 are secured in a working position. Respectively, when the propping elements 101 and 102 have become swiveled to a storage position, the recess 110a has also become rotated along with the locking flange 110 to the alignment with the locking bar 108, whereby the lug 108a, by virtue of a force provided by the spring 107a, is able to penetrate into the recess 110a for securing the locking flange 110.

In order to release the locking flange 110, the locking bar 108 has associated therewith displacement means 107 for the locking bar 108. In this embodiment, the displacement means 107 comprise a draw cable, which is attached to the locking bar 108 and which can be pulled preferably manually by the motorcycle driver against a springback factor of the spring 107a, for example by means of a lever attached to the handlebar or some other suitable spot on the motorcycle 1. The automation of this feature is possible for example by means of a hydraulic actuator. Accordingly, the lug 108a disengages from each relevant recess, thus releasing the locking flange 110, and thereby the distance piece 104 and the propping elements 101 and 102, for a swiveling motion between the working position and the storage position.

Figure 5:
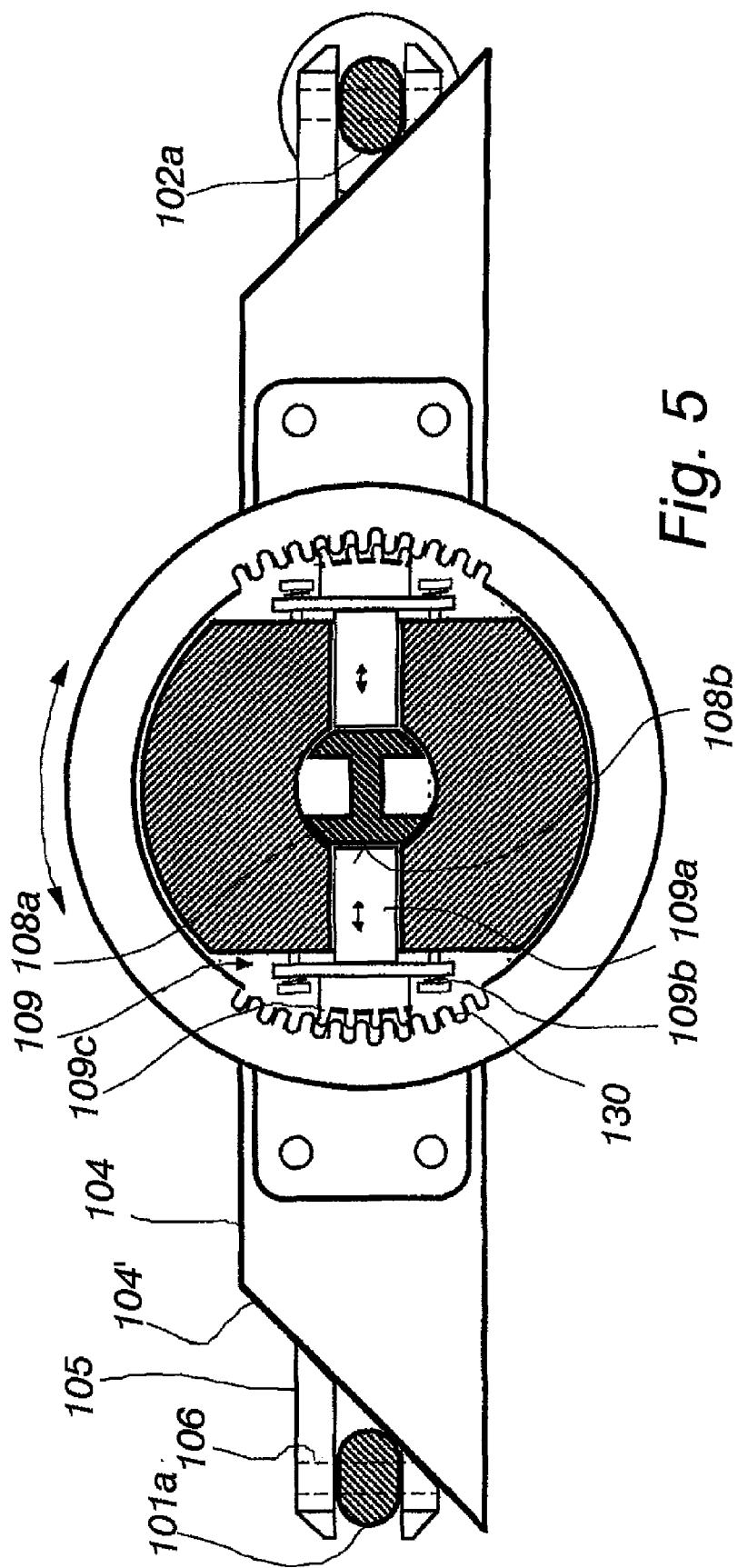
FIG. 5 shows a view taken along a section line V-V in FIG. 4.

FIGS. 4 and 5 visualize retainer elements 109 included in the locking means. In this case, the number of retainer elements 109 is two and those are set on the opposite sides of the locking bar 108 in holes formed in a radial direction in the second body segment 103b. The retainer element 109 is an elongated peg, having its first end 109a adapted to slide against a tapering surface 108b and a sliding surface 108c as the locking bar 108 shifts in response to the above-described action of the power unit 107a. The retainer element 109 has its second end extending into a space between the first body segment 103a and the second body segment 103b (cf. FIG. 5). The second end is provided with a gearing 109c. As the retainer element 109 is pushed by the locking bar 108 through the intermediary of its tapering surface 108b, the gearing 109c makes its way towards a circumferential complementary gearing 130 which, being formed on an internal surface of the first body segment 103a, takes the shape of a sector arc. Hence, the second body segment 103b and thereby the propping elements 101 and 102 become locked at a desired deflection angle with respect to the rotation axis D. The circumferential length of the complementary gearing 130 determines a maximum deflection angle.

With the locking bar 108 dislodged from the locking position, it is in response to the action of power elements 109b provided in contact with the retainer element 109 that the retainer elements 109 move towards each other over such a distance that the gearings 109c disengage from the complementary gearing 130, thereby releasing the second body segment 103b from the above-mentioned locked condition. Preferably, between the body segments 103a and 103b are provided resetting means (not shown), whereby the body segment 103b rotates automatically back to a configuration required by the storage position.

In the storage position, as depicted in FIG. 4, the propping elements 101 and 102 are preferably in a perpendicularly crosswise position relative to a longitudinal direction of the tube element 105. In other words, the propping elements 101 and 102 have been swiveled around the joints 106 to become substantially co-directional with the motorcycle chassis. At this point, the propping elements 101 and 102 are located at a distance from each other, in other words on opposite sides of the motorcycle chassis, preferably in the proximity of the motorcycle chassis.

A heavy weapon-equipped motorcycle as described in the example can be left in its firing position by itself. Therefore, in association with the weapon 70, preferably in its forepart, is provided a camera sight 72, from which a picture for aiming is transmitted either onto a display 73 on top of the motorcycle along a wired or wireless communication medium 72a and/or onto a second display 74 mounted in connection with a control unit 75. A suspension for the forepart of the weapon 70 is established by articulated arms and/or cylinders as described above. These can be designed for remote controlled operation by means of the control unit 75, comprising necessary control logic and instruments (among others, a transmitter/receiver), whereby the weapon can be directed in response to remote control. Hence, for example, the suspension establishing servo-controlled hydraulic cylinders are equipped with receiver means for receiving control instructions obtained from the control unit 75 and for further executing the same. Naturally, the lifting cylinder 61 can be designed for remote control in a similar fashion.

The present invention is not limited to the presented working example, but is applicable in many ways within a scope of protection as defined in the appended claims.

What is claimed is:

1. A stand for a motorcycle, a heavy weapon, or a motorcycle equipped with the heavy weapon, said stand comprising a propping unit as well as pivoting means for enabling a swiveling motion of the propping unit between a working position and a storage position, wherein the propping unit includes two propping elements, and that the pivoting means include:
   a pivoting element, which controls the propping elements to simultaneously swivel and spread outward from a storage position in the proximity of the chassis of a motorcycle, the heavy weapon or a motorcycle equipped with the heavy weapon to a working position, as well as
   locking means for securing the propping elements in the working position and in the storage position, wherein
   the pivoting element is adapted to allow a swiveling motion of the propping elements about a rotation axis extending in the advancing direction of a motorcycle, the heavy weapon or the motorcycle equipped with a heavy weapon, or about a rotation axis extending substantially in a longitudinal direction of the heavy weapon, and
   the pivoting means include formations for locking the propping elements in a desired swiveling position.

2. A stand as set forth in claim 1, wherein the propping elements are provided on the opposite sides of a motorcycle, the heavy weapon or the motorcycle equipped with the heavy weapon.

3. A stand as set forth in claim 1, wherein the pivoting element includes a first body segment, which is adapted to be stationary with respect to the chassis of a motorcycle, the heavy weapon or the motorcycle equipped with the heavy weapon, as well as a second body segment provided in connection with the first body segment and adapted to be pivotable with respect to the first body segment.

4. A stand as set forth in claim 1, wherein the motorcycle equipped with the heavy weapon is outfitted with a lifting device, which enables raising and lowering a rear portion of the heavy weapon for vertical aiming.

5. A stand as set forth in claim 1, wherein the heavy weapon is provided with a camera sight, the picture delivered therefrom being transmissible by way of wired or wireless communication media onto a display provided in contact with the motorcycle equipped with the heavy weapon, or onto a display located at a distance from the motorcycle equipped with the heavy weapon.

6. A stand as set forth in claim 1, wherein the motorcycle equipped with the heavy weapon is outfitted with articulated arms and/or cylinders, which are capable of being remote controlled by means of an external control unit for directing the heavy weapon.

* * * * *

UNITED STATES PATENT AND TRADEMARK OFFICE
CERTIFICATE OF CORRECTION

PATENT NO.        : 8,544,377 B2
APPLICATION NO.   : 13/389691
DATED             : October 1, 2013
INVENTOR(S)       : Rajalin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 74 days.

Signed and Sealed this
Fifteenth Day of September, 2015

Michelle K. Lee
*Director of the United States Patent and Trademark Office*